United States Patent Office 3,458,330
Patented July 29, 1969

3,458,330
GLASS COMPOSITIONS, METHOD AND ARTICLES
Nils Tryggve E. A. Baak, Waterville, Ohio, assignor to Owens-Illinois, Inc., a corporation of Ohio
No Drawing. Filed June 21, 1965, Ser. No. 465,716
Int. Cl. C03c 3/04, 3/22
U.S. Cl. 106—39                                    11 Claims

ABSTRACT OF THE DISCLOSURE

Glass compositions formed by melting batch ingredients corresponding to a mixture of (1) 25% to 85% taeniolite and (2) 75% to 15% of lithium metasilicate, magnesium metasilicate, or calcium metasilicate or mixtures thereof. Crystallized glass compositions are formed by in situ thermal crystallization of these glass compositions.

---

The present invention relates in general to novel inorganic compositions that possess certain desirable properties and characteristics. In its more particular aspects, the present invention relates to novel glass compositions that possess certain desirable properties and characteristics, including a relatively long working range, suitable melting temperatures and the ability to be thermally crystallized. In addition, the present invention relates to thermal crystallization of novel glass compositions and crystallized glass articles produced from the foregoing glass compositions.

It is a primary object of the present invention to provide novel glass compositions that possess desirable properties and characteristics.

It is a further object of the present invention to provide novel crystallized glass compositions that possess desirable properties and characteristics.

It is a further object of the present invention to provide novel glass compoitions that have good melting temperatures, relatively long working ranges and can readily be thermally crystallized.

It is a further object of the present invention to provide glasses that may be thermally crystallized without adding special nucleating agents.

It is a further object of the present invention to provide a method for obtaining novel glass and crystallized glass products.

It is a further object of the present invention to provide novel glass and thermally crystallized glass compositions having useful properties that make them suitable for a wide variety of purposes.

It is still a further object of the present invention to provide articles comprising the novel glass compositions described herein.

It is a still further object of the present invention to provide articles comprising thermally crystallized glasses described herein.

In attaining the above objects, one feature of the present invention resides in glass compositions based on the taeniolite mica composition.

A further feature of the present invention resides in glass compositions based on the composition $$KMg_2LiSi_4O_{10}F_2$$

A further feature of the present invention resides in glass compositions based on the taeniolite mica composition which had added thereto a material selected from the group consisting of lithium disilicate, magnesium metasilicate, calcium metasilicate and mixtures thereof.

A further feature of the present invention resides in forming glass compoistions of taeniolite mica and varying amounts of a solvent phase selected from the group consisting of lithium disilicate, magnesium metasilicate, calcium metasilicate and mixtures thereof.

A further feature of the present invention resides in thermally crystallizing glass compositions based on the taeniolite mica composition.

A further feature of the present invention resides in glass compositions based on the taeniolite mica composition having added thereto a suitable solvent phase and thermally crystallizing taeniolite mica crystalline phase from the melt.

A further feature of the present invention resides in the extremely thin films and other articles which can be made from the foregoing novel glass compositions.

The above and additional objects, features and advantages of the present invention will become apparent from the following detailed description thereof.

According to the present invention, novel glass compositions are provided based on the taeniolite mica compostiion which may be represented as $KMg_2LiSi_4O_{10}F_2$ and which have added thereto a member selected from the group consisting of lithium disilicate, magnesium metasilicate, calcium metasilicate and mixtures thereof. Taeniolite mica has a chemical composition corresponding to the formula $KF \cdot LiF \cdot 2MgO \cdot 4SiO_2$. Characterized by being extremely fluid when melted at 2200° F., taeniolite mica devitrifies spontaneously with a vigorous exothermal reaction on cooling in air. It has been found that taeniolite can be crystallized on cooling from the melt which has present a solvent phase of a particular type. This type of crystallization is believed to promote and enhance crystallization of the solvent phase which either serves as a nucleating agent or by providing a driving force energy for crystallization. When cobmined with the other phases as will be described hereinafter, the taeniolite has been found to be effective in promoting controlled devitrification.

The compositions of the present invention have desirable relatively low melting temperatures and long working ranges thereby making them particularly suitable for the production of extremely thin glass films which have a variety of useful applications, particularly in the electronic industry. Films of one-tenth millimeter thickness and lower can be prepared from the melts of the novel glass compositions. The crystallized glass compositions to be described hereinafter exhibit an increased strength of as much as three times as great when compared to the crystallizable glass. The crystallized materials have a wide variety of uses and because of their particularly pleasing appearance, can be used for decorative purposes, as inlays in structural components, furniture and the like.

Glasses of the present invention readily undergo a controlled devitrification without the necessity of adding special nucleating agents such as titanium dioxide, zirconium dioxide and the like, which have heretofore been necessary in other types of glasses. The tendency of compositions containing taeniolite to devitrify increases with the amount of taeniolite introduced and with the amount of fluorine retained in the melt.

In accordance with the present invention, novel glasses having a relatively long working range and good melting temperatures that are crystallizable through heat treatment can be made from compositions consisting essentially of taeniolite mica composition and a material selected from the group consisting of lithium disilicate, magnesium metasilicate, calcium metasilicate and mixtures of these materials.

In its more particular aspects, the present invention provides compositions consisting essentially of 25 to 85% by weight of taeniolite mica and 15 to 75% of a material selected from the group consisting of lithium disilicate, magnesium metasilicate, calcium metasilicate and mixtures of these materials.

It will, of course, be apparent from the description of the invention, and particularly the examples, that the ingredients of the novel compositions of the present invenion may be added in any suitable form, including $SiO_2$, MgO, $K_2O$, $Li_2O$, $B_2O_3$, as well as carbonates, nitrates, fluorides, etc.

Glasses resulting from the compositions of the present invention are superior to soda-lime glasses from the standpoint of low-forming temperature and long working ranges and are approximately equivalent to soda-lime glasses in strength and hardness. Crystallized glass articles produced according to the present invention, however, show a considerable improvement and are characterized by high strength and hardness, high thermal expansion and other desirable properties. Variations in the characteristics and behavior of the glasses and crystallized glass compositions of the present invention can be obtained by selection and variation of the ratios of the various components. Although the glasses have been described as based upon taeniolite mica compositions, the melts may be produced either by incorporation of taeniolite mica as a preconstituted material, or can be prepared from raw materials required to form this taeniolite phase. Varying proportions of the solvent phase selected from the group consisting of lithium disilicate, magnesium metasilicate and calcium metasilicate and mixtures thereof may be added as desired.

Representative compositions encompassed by the present invention are set forth below.

| Constituent | Glass compositions (weight percent) | | | |
|---|---|---|---|---|
| | A | B | C | D |
| Taeniolite | 50 | 50 | 33.3 | 50 |
| Lithium disilicate [1] | 50 | 25 | 33.3 | |
| Magnesium metasilicate [2] | | 25 | 33.3 | 25 |
| Calcium metasilicate [3] | | | | 25 |

[1] $LiO_2 \cdot 2SiO_2$
[2] $MgO \cdot SiO_2$
[3] $CaO \cdot SiO_2$

In the examples that are shown in the tables, various size melts made of the taeniolite mica composition and solvent phase were prepared. The samples ranged in size from about 20 gram specimens to 300 gram specimens and even larger. Generally platinum crucibles were used, although any other suitable type of crucible may be employed. In making the glasses of the present invention it is generally desirable to maintain fluorine loss at a minimum, and for that purpose a lid should be put on the melting pot. Various other means to keep fluorine loss at a minimum can also be employed.

In the preparation of the in situ thermally crystallized glass specimens, small bottles and tumblers were blown by a glass blower and then subjected to an in situ thermal crystallization cycle which comprised heating the specimen at 1400° F. for 4 hours to generate the nucleation sites. Thereafter, the crystallization proceeded and the controlled cycle required approximately 23 hours. Generally, however, the thermal crystallization cycle comprises heating the glass composition or shaped article to the nucleation range of the glass to permit the formation of nucleation sites. Thereafter heating is usually continued to obtain desirable crystal formation.

The optimum heat treatment to produce the crystallization depends on the particular glass composition, the ratio of its ingredients and the like. For this reason it is not feasible to specify a particular heat treatment schedule that would be common to all glasses of the invention. Usually it is preferred to conduct the first stage of the heat treatment at relatively low temperature that is in the region of high rate of nuclei or crystallite formation. In general, the heat treatment comprises heating the article in the initial stage between the annealing point and about 250° F. above the annealing point for a time of at least about 5 minutes, preferably about 1 hour, and thereafter heat treating at a higher crystallization temperature. The entire heat treatment can also be carried out at one temperature for a longer period of time. The specific examples show representative heat treatments.

The mixtures of the taeniolite mica forming ingredients and the solvent phase can range from 25 to 85% by weight of the taeniolite mica forming constituents. It has been observed that the most desirable compositions generally are near the mid range of the system wherein 50 parts of the the taeniolite mica forming components are present and 50 parts of the solvent phase.

Most promising of the compositions is 50% taeniolite-50% lithium disilicate. The following tables contain representative samples which serve to illustrate the compositions of the present invention but the data reported therein is not intended to be limiting of the invention in any way. All values are in weight percent.

In the following tables the letter and number at the head of each column are code numbers serving merely for purposes of identification. Compositions wherein calcium or magnesium metasilicate is present as the solvent phase are shown in Table II.

As shown in Table III, varying amounts of selected other ingredients may be added to modify the properties of the products. Illustrative of such materials are aluminum oxide ($Al_2O_3$) and boric oxide ($B_2O_3$). It is preferred that when these materials are added, they should be added in the anhydrous state so as to prevent the formation of HF during the melting and thereby avoid excessive fluorine loss.

TABLE I.—OXIDE COMPOSITIONS

| | E-1284 | E-1285 | E-1286 | E-1287 | E-1288 | E-1289 |
|---|---|---|---|---|---|---|
| $SiO_2$ | 69.7 | 69.7 | 67.58 | 71.72 | 74.83 | 64.48 |
| MgO | 10.0 | 10.0 | 12.00 | 8.00 | 5.00 | 15.00 |
| $K_2O$ | 5.8 | 5.8 | 6.96 | 4.64 | 29.00 | 8.70 |
| $Li_2O$ | 11.8 | 11.8 | 10.22 | 13.48 | 14.25 | 7.77 |
| $F_2$ | 4.7 | 4.7 | 5.64 | 3.76 | 2.35 | 7.05 |

TABLE II.—OXIDE COMPOSITIONS

| | E-1368 | E-1369 | E-1370 | E-1371 | E-1372 |
|---|---|---|---|---|---|
| $SiO_2$ | 66.7 | 65.0 | 64.5 | 59.4 | 62.3 |
| MgO | 11.8 | 14.8 | 13.4 | 24.0 | 19.0 |
| CaO | 3.6 | 3.7 | 5.5 | | |
| $Li_2O$ | 8.8 | 7.0 | 7.1 | 3.0 | 5.7 |
| $K_2O$ | 5.2 | 5.3 | 5.3 | 7.8 | 7.4 |
| $F_2$ | 4.9 | 5.1 | 5.1 | 7.5 | 7.2 |

TABLE III.—OXIDE COMPOSITIONS

| | E-1376 | E-1378 | E-1379 | E-1380 | E-1381 |
|---|---|---|---|---|---|
| $SiO_2$ | 62.9 | 63.6 | 61.2 | 62.4 | 65.8 |
| $Al_2O_3$ | 5.2 | 16.2 | | 7.6 | 6.2 |
| MgO | 13.6 | 6.4 | 26.5 | 15.1 | 12.3 |
| $Li_2O$ | 6.5 | 5.9 | 2.2 | 4.3 | 7.1 |
| $K_2O$ | 6.7 | 4.2 | 5.8 | 5.87 | 5.7 |
| $F_2$ | 6.4 | 4.0 | 5.6 | 5.7 | 4.6 |

| | E-1383 | E-1384 | E-1385 | E-1386 | E-1387 |
|---|---|---|---|---|---|
| $SiO_2$ | 64.8 | 64.8 | 64.8 | 64.7 | 64.6 |
| $Al_2O_3$ | 6.9 | 1.9 | 5.0 | 11.0 | 18.3 |
| MgO | 10.9 | 13.5 | 11.9 | 8.7 | 4.8 |
| $Li_2O$ | 8.0 | 8.1 | 8.0 | 8.0 | 8.0 |
| $K_2O$ | 6.4 | 7.9 | 6.9 | 5.1 | 2.8 |
| $F_2$ | 5.1 | 6.4 | 5.6 | 4.1 | 2.3 |

| | E-1389 | E-1390 | E-1391 | E-1392 | E-1393 | E-1394 | E-1395 |
|---|---|---|---|---|---|---|---|
| $SiO_2$ | 59.5 | 64.1 | 64.8 | 64.2 | 68.7 | 68.3 | 68.0 |
| $Al_2O_3$ | | | 6.9 | 6.1 | 2.9 | 5.3 | 7.0 |
| MgO | 28.5 | 18.4 | 10.9 | 14.4 | 9.2 | 8.3 | 7.6 |
| $Li_2O$ | 2.1 | 6.8 | 8.0 | 7.1 | 11.1 | 10.8 | 10.6 |
| $K_2O$ | 6.7 | 7.2 | 6.4 | 5.6 | 5.4 | 4.9 | 4.4 |
| $F_2$ | 5.4 | 5.8 | 5.1 | 4.5 | 4.4 | 3.9 | 3.6 |

|  | E-1396 | E-1397 | E-1398 | E-1399 | E-1400 | E-1401 |
|---|---|---|---|---|---|---|
| $SiO_2$ | 67.1 | 65.9 | 69.0 | 68.0 | 66.2 | 62.7 |
| $Al_2O_3$ | 12.5 | 19.6 |  |  |  |  |
| MgO | 5.6 | 2.9 | 9.9 | 9.8 | 9.5 | 9.0 |
| $Li_2O$ | 9.9 | 9.0 | 11.7 | 11.5 | 11.2 | 10.6 |
| $K_2O$ | 3.3 | 1.7 | 5.7 | 5.7 | 5.5 | 5.2 |
| $F_2$ | 2.7 | 1.4 | 4.6 | 4.6 | 4.4 | 4.2 |
| $B_2O_3$ |  |  | 1.0 | 2.5 | 5.0 | 10.0 |

|  | E-1406 | E-1407 | E-1408 | E-1409 |
|---|---|---|---|---|
| $SiO_2$ | 68.9 | 67.7 | 65.7 | 61.7 |
| MgO | 10.0 | 10.0 | 10.0 | 10.0 |
| $Li_2O$ | 11.7 | 11.4 | 10.9 | 9.9 |
| $K_2O$ | 5.8 | 5.8 | 5.8 | 5.8 |
| $B_2O_3$ | 1.0 | 2.5 | 5.0 | 10.0 |
| $F_2$ | 4.7 | 4.7 | 4.7 | 4.7 |

The following examples are further illustrative of the present invention and should not be considered limiting in any way.

Example I

A melt was prepared containing 50% taeniolite and 50% lithium disilicate. The composition had the following formulation expressed as oxide content in weight percent:

| | |
|---|---|
| $SiO_2$ | 69.7 |
| MgO | 10.0 |
| $K_2O$ | 5.8 |
| $Li_2O$ | 11.8 |
| $F_2$ | 4.7 |

Kona Quintus quartz was used for the silica and the remaining ingredients were reagent grade materials. The melting was carried out at a temperature of 2400° F. for approximately 18 hours. The melt showed only a slight tendency to devitrify. The refractive index was measured as 1.5332 and the modulus of rupture of the vitreous phase in p.s.i. was 7000 to 9000. To devitrify the product, the following heat treatment was carried out. The glass was heated for 1 hour at 1020° F. Thereafter the temperature was raised to 1080° F. for 1 hour and finally 1 hour at 1480° F. After devitrification, the modulus of rupture showed a very substantial increase and was measured as 36,000 to 43,000 p.s.i.

The thermal expansion of the vitreous material was measured at $96.8 \times 10^{-7}$ (0–300° C.) and that of the devitrified product was observed to be $89.8 \times 10^{-7}$ (0–300° C.). The crystalline phases present are believed to be lithium disilicate as the principal phase, and as the secondary phase taeniolite, lithium metasilicate and magnesium metasilicate.

Example II

A melt containing the following ingredients expressed in oxide weight percent was prepared:

| | |
|---|---|
| $SiO_2$ | 64.48 |
| MgO | 15.00 |
| $K_2O$ | 8.70 |
| $Li_2O$ | 7.77 |
| $F_2$ | 7.05 |

The melt was made at 2440° F. for about 5 hours and the melt was observed to be somewhat cloudy. Thereafter, the heat treatment was carried out by raising the temperature 10° F. per minute from room temperature to 1410° F. where the material was held for approximately one hour.

The glasses of the present invention may contain various minor amounts of other ingredients which may enter as impurities or be added to contribute any desired special effect. Such variations in the compositions are to be considered as contemplated within the scope of the present invention. The starting materials can be added in any suitable form and, as has been pointed out previously, can be preconstituted or formed from raw materials.

It is understood that various other modifications will be apparent to and can readily be made by those skilled in the art without departing from the scope and spirit of this invention.

What is claimed is:

1. A glass composition formed by melting a batch consisting essentially of ingredients corresponding to a mixture of (1) 25% to 85% of taeniolite and (2) 75% to 15% of a material selected from the group consisting of lithium disilicate, magnesium metasilicate and calcium metasilicate and mixtures thereof, based on the total weight of the composition.

2. A glass composition formed by melting a batch consisting essentially of ingredients corresponding to a mixture of 50% taeniolite and 50% lithium disilicate, based on the total weight of the composition.

3. A glass composition formed by melting a batch consisting essentially of ingredients corresponding to a mixture of about 50% taeniolite, about 25% lithium disilicate and about 25% of magnesium metasilicate, based on the total weight of the composition.

4. A glass composition formed by melting a batch consisting essentially of ingredients corresponding to a mixture of about 33% taeniolite, about 33% lithium disilicate and about 33% magnesium metasilicate based on the total weight of the composition.

5. A glass composition formed by melting a batch consisting essentially of ingredients corresponding to a mixture of about 50% taeniolite, about 25% calcium metasilicate and about 25% magnesium metasilicate, based on the total weight of the composition.

6. A crystallized glass composition formed by the in situ thermal crystallization of a glass formed from a batch consisting essentially of ingredients corresponding to a mixture of (1) 25% to 85% of taeniolite and (2) 75% to 15% of a material selected from the group consisting of lithium disilicate, magnesium metasilicate and calcium metasilicate and mixtures thereof, based on the total weight of the composition.

7. A crystallized glass composition formed by the in situ thermal crystallization of a glass formed from a batch consisting essentially of ingredients corresponding to a mixture of 50% taeniolite and 50% lithium disilicate, based on the total weight of the composition.

8. A crystallized glass composition formed by the in situ thermal crystallization of a glass formed from a batch consisting essentially of ingredients corresponding to a mixture of about 50% taeniolite, about 25% lithium disilicate and about 25% of magnesium metasilicate, based on the total weight of the composition.

9. A crystallized glass composition formed by the in situ thermal crystallization of a glass formed from a batch consisting essentially of ingredients corresponding to a mixture of about 33% taeniolite, about 33% lithium disilicate and about 33% magnesium metasilicate based on the total weight of the composition.

10. A crystallized glass composition formed by the in situ thermal crystallization of a glass formed from a batch consisting essentially of ingredients corresponding to a mixture of about 50% taeniolite, about 25% calcium metasilicate and about 25% magnesium metasilicate, based on the total weight of the composition.

11. A method of forming crystallized glass compositions comprising forming a batch consisting essentially of ingredients corresponding to a mixture of (1) 25 to 85% of taeniolite and (2) 75 to 15%, based on the total weight of the composition, of a material selected from the group consisting of lithium disilicate, magnesium metasilicate and calcium metasilicate and mixtures thereof, forming a glass from said batch and subjecting said glass to in situ thermal crystallization by heating the glass to a temperature of at least about the annealing temperature of the glass for at least about 5 minutes.

References Cited

UNITED STATES PATENTS

| | | | |
|---|---|---|---|
| Re. 15,727 | 12/1923 | Crossley | 106—52 |
| 2,516,983 | 8/1950 | Hatch. | |
| 3,006,775 | 10/1961 | Chen | 106—39 |
| 3,022,179 | 2/1962 | Morrissey | 106—39 |
| 3,338,692 | 8/1967 | Hessinger | 106—52 |
| 2,778,713 | 1/1957 | Noda. | |

FOREIGN PATENTS

| | | |
|---|---|---|
| 247,589 | 9/1960 | Australia. |
| 1,268,125 | 9/1960 | France. |
| 635,391 | 11/1963 | Belgium. |

OTHER REFERENCES

Hinz: Chemical Abstracts, Item 12615c, vol. 53, July 10, 1959.

Lungu et al.: "Fine Ceramic Materials Obtained from Crystallized Glass" Industria Usoara, vol. 5, February 1958, pp. 63–65, 106–39.

Eppler: "Glass Formation and Recrystallization in the Lithium Metasilicate Region of the System $$Li_2O—Al_2O_3—SiO_2"$$

Glass Industry,, September 1962, pp. 493–494, 106–39.

Thakur: "Nucleation and Controlled Crystallization of Glass," Glass & Ceramic Bulletin of India, vol. 10, No. 2, Apr. 1963, p. 57, 106–39.

HELEN M. McCARTHY, Primary Examiner

U.S. Cl. X.R.

65—33; 106—52, 54